Feb. 8, 1927.

O. G. EBERT 1,616,788

TRAILER COUPLING DEVICE

Filed Sept. 13, 1926

Inventor
O. G. Ebert

By Jack A. Ochler
Attorney

Patented Feb. 8, 1927.

1,616,788

UNITED STATES PATENT OFFICE.

OSWALD G. EBERT, OF HAMLIN, TEXAS.

TRAILER-COUPLING DEVICE.

Application filed September 13, 1926. Serial No. 135,104.

This invention relates to new and useful improvements in trailer coupling devices.

The object of the invention is to provide a coupling for attachment to the rear end of a motor vehicle, such as an automobile, truck, tractor, or the like, and arranged to be clamped to the front axle of the trailer and connected with the steering mechanism thereof in such a manner that the trailer will properly follow, or track, the vehicle.

A particular object of the invention is to provide a simple supporting member which may be quickly attached to the axle of the trailer in a practical and efficient manner.

A further object of the invention is to provide a novel manner of supporting and fastening the pivot bolt.

A construction designed to carry out the invention will be hereinafter described together with other features of the invention.

Figure 1:
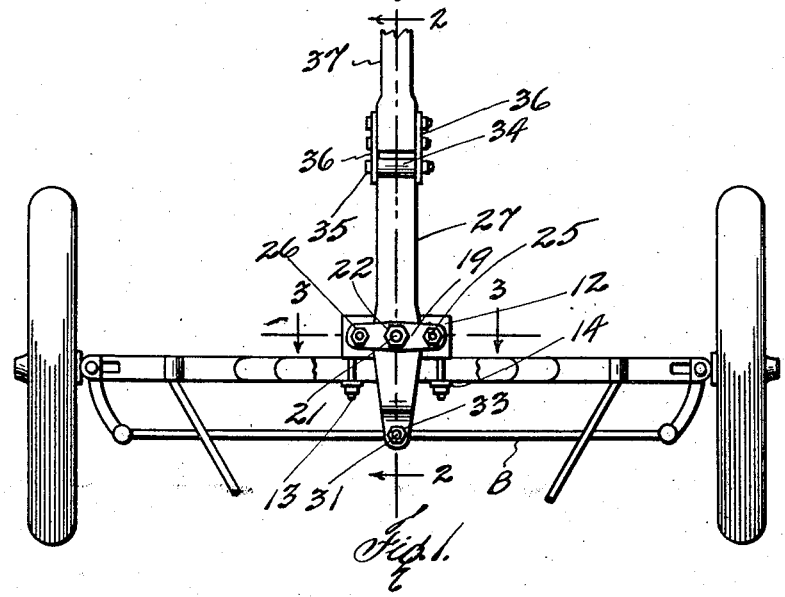
Figure 2:
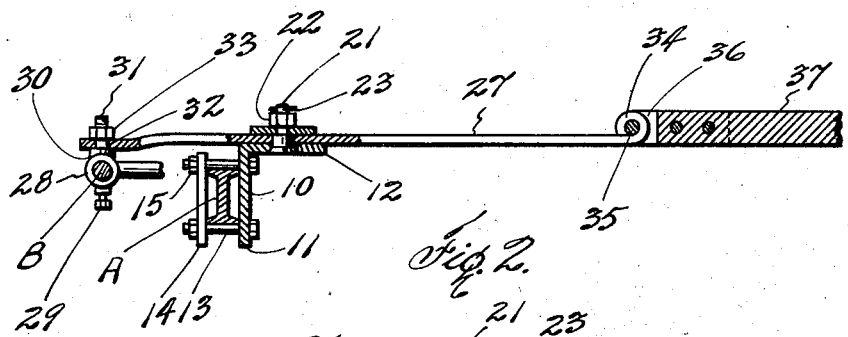
Figure 3:
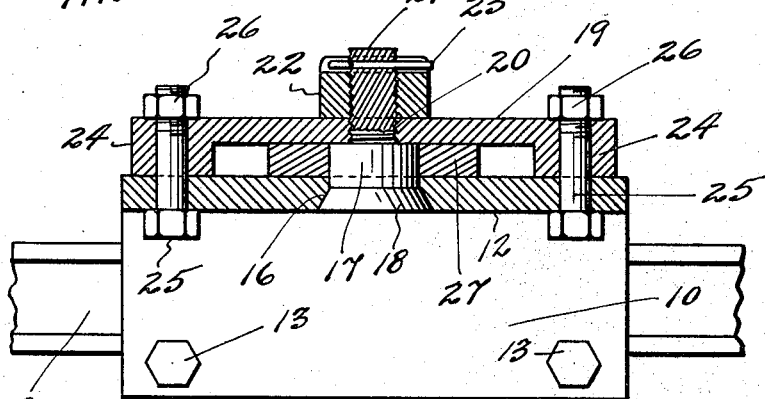

The invention will be more readily understood from a reading of the following specification and by reference to the accompanying drawings, in which an example of the invention is shown and wherein:

Fig. 1 is a plan view showing a coupling constructed in accordance with my invention, attached to the front axle of a trailer, Fig. 2 is an enlarged longitudinal sectional view taken on the line 2—2 of Fig. 1, and Fig. 3 is an enlarged cross-sectional view taken on the line 3—3 of Fig. 1.

In the drawings the numeral 10 designates a supporting bracket formed of plates 11 and 12 bent at right angles to each other. The plate 11 is punched to receive bolts 13 spaced to extend over and under the axle A of the trailer and clamp the latter there-between, four bolts being employed. A keeper plate 14 is fastened against the rear side of the axle by said bolts which pass therethrough and receive nuts 15. By tightening the nuts 15 the bracket 10 is rigidly fastened at the center of the axle and held against play in any direction.

The plate 12 of the bracket is provided at its central portion with a counter-sunk aperture 16. A pivot bolt 17 is passed upwardly through the aperture from the bottom of the plate and has its counter-sunk head 18 welded or otherwise secured in the aperture.

A keeper bar 19 has a central aperture 20 receiving the reduced screw-threaded stud 21 of the bolt 17. The keeper bar is fastened on the shoulder of the bolt by a nut 22 screwed down on to said bar and a cotter key 23 passed through the end of the stud. The keeper bar has depending spacing bosses 24 and its ends resting on the plate 12. Bolts 25 extending up through the plate, bosses and bar receive nuts 26, whereby said bar is fastened on the plate and its intermediate portion is spaced above the plate.

A steering lever 27 is pivoted intermediate its ends on the bolt 17 between the plate 12 and the bar 19. This lever is free to swing in a horizontal plane. On the connecting rod B of the steering gear of the trailer, I mount a pivot lug 28. This lug has a central eye receiving the rod B and is fastened by a set screw 29. At its upper portion, it is provided with a circular flange 30 having a central stud 31 screw-threaded at its upper end. The lever 27 has an eye 32 receiving the stud and is confined by a nut 33.

The lever 27 at its forward end is provided with a transverse sleeve 34 receiving a hinge bolt 35. The hinge bolt is pivoted in the rear ends of connecting straps 36 fastened to a tongue 37 or any other suitable draw bar connection. The tongue 37 is suitably fastened to the automobile, truck or other vehicle.

The particular advantage of this invention is its simplicity, durability and ease with which it may be installed and replaced. The use of the clamp bolts 13 and the plate 14 is superior to U-bolts, because a much better clamp is obtainable and the bracket may be more rigidly fastened to the axle. The use of the pivot bolt 17 instead of an integral boss or stud enables an easy replacement in case of breakage. The one piece lug bolt reduces the number of parts and makes for simplicity.

Various changes in the size and shape of the different parts, as well as modifications and alterations, may be made within the scope of the appended claims.

What I claim, is:

1. In a trailer coupling, a supporting bracket comprising a vertical plate and a horizontal plate, clamp bolts penetrating the vertical plate, a clamp keeper plate mounted on said clamp bolts, a pivot bolt mounted in the horizontal plate, a lever pivoted on the horizontal plate around the pivot bolt, means for retaining the lever in place, a draw bar member hinged to the front end of the lever, and a pivot lug pivoted to the rear end of the lever, 2. In a trailer coupling, a supporting bracket comprising a vertical plate and a horizontal plate, clamp bolts penetrating the vertical plate, a clamp keeper plate mounted in said clamp bolts, a pivot bolt mounted in the horizontal plate, a keeper bar having spacing bosses at each end and bolted to the horizontal plate, a reduced screw threaded stud extending from the pivot bolt through the keeper bar, a lever pivoted on the pivot bolt between the keeper bar and the horizontal plate, a draw bar member hinged to the front end of the lever, and a lug bolt pivoted to the rear end of the lever.

In testimony whereof I affix my signature.

OSWALD G. EBERT.